Patented Feb. 9, 1932

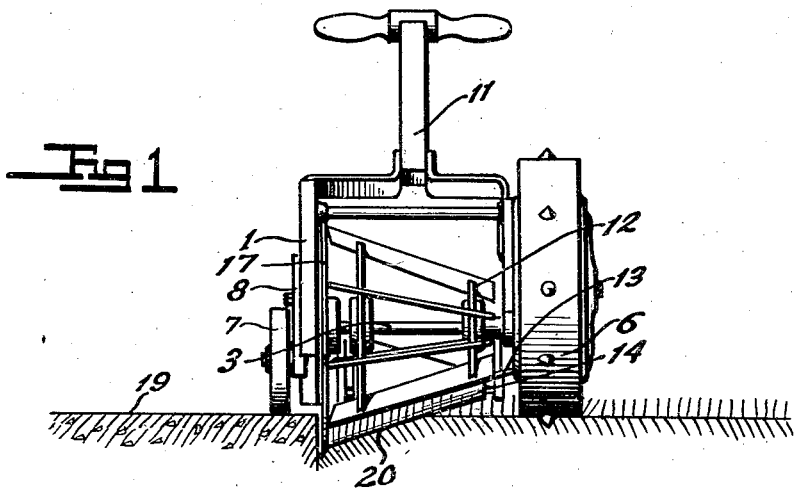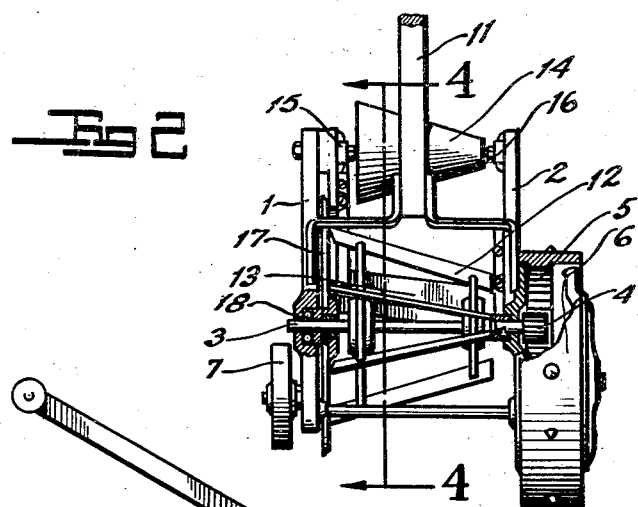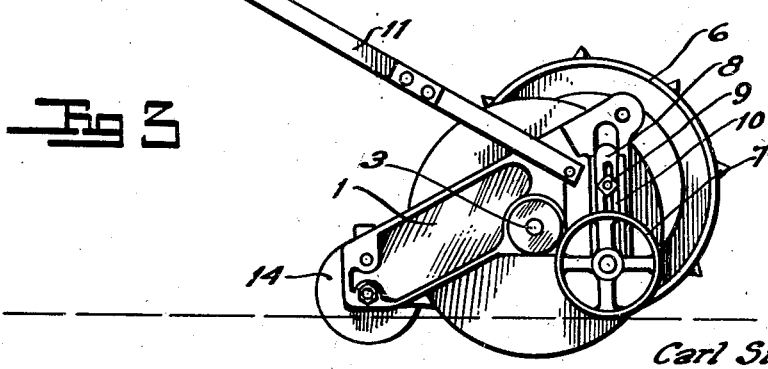

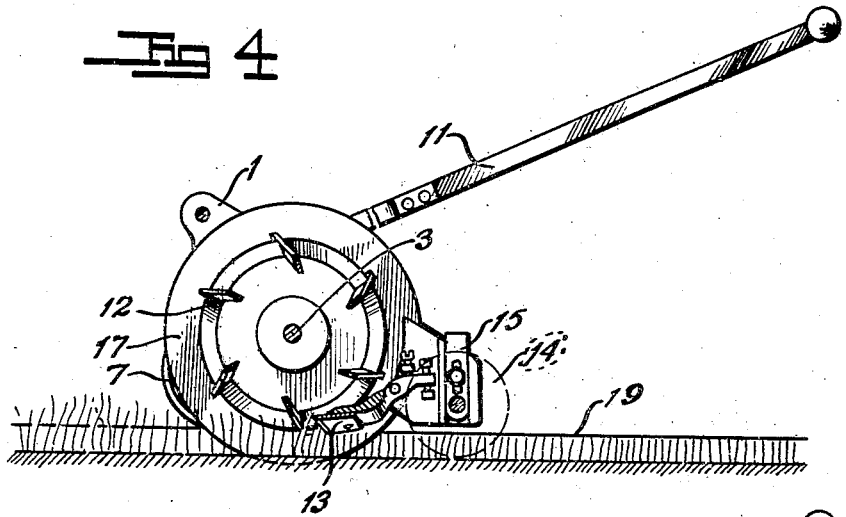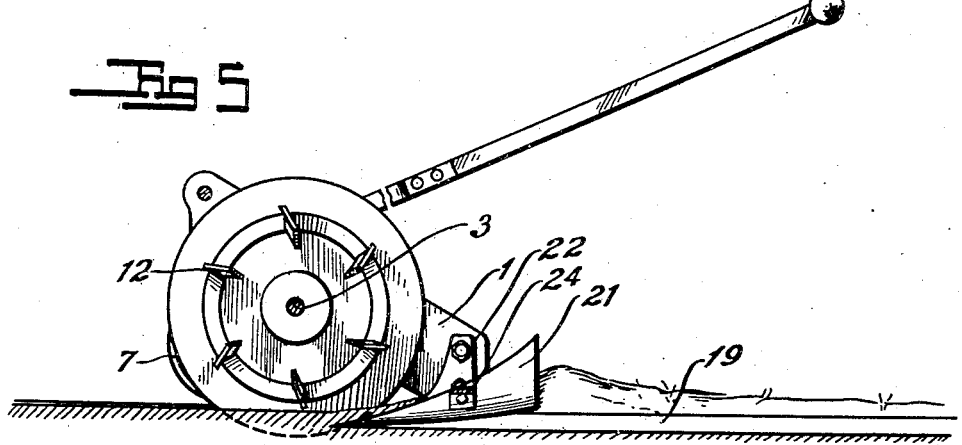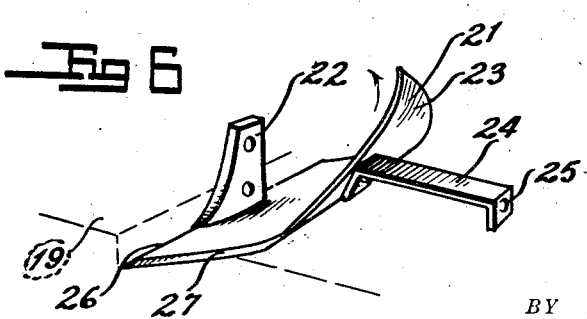

1,844,190

UNITED STATES PATENT OFFICE

CARL STULTZ, OF WICHITA, KANSAS

LAWN EDGER

Application filed January 28, 1929. Serial No. 335,532.

This invention relates to lawn edgers and it is particularly adapted to edge the lawn adjacent to walks and the like.

The novelty of the invention will be clearly apparent by reference to the following description in connection with the accompanying drawings in which:

Fig. 1 is a front elevational view of a machine constructed in accordance with my invention.

Fig. 2 is a top plan view of the same, parts being shown in section.

Fig. 3 is a side elevational view of the machine.

Fig. 4 is a sectional view on the line 4—4 of Figure 2.

Fig. 5 is a similar sectional view with a cutter bar and packing wheel removed and a moldboard and Fig. 6 is a perspective view of the moldboard and the securing bar.

The machine is shown as consisting of a frame having side castings 1 and 2 to which is secured an axle 3 having a pinion 4 at one end driven by an internal gear 5 on the tractor wheel 6 which supports one side of the frame. The opposite side of the frame is supported by a wheel 7 carried by a bracket 8, vertically adjustable in the casting 1 through the medium of a bolt 9 in slot 10 in bracket 8, the bolt projecting through a hole in the casting 1 as will be well understood. A handle 11 is provided for the machine and it is secured to the two side castings or plates 1 and 2 in the usual way. The reel 12 of known construction is fast on the axle or shaft 3 and it co-operates with the cutter bar 13 to cut grass in the usual way. The packing wheel 14, shown as a cone, is journaled in bearings carried by the brackets 15 and 16, supported by the sides 1 and 2. The structure so far described is old and well known. My invention relates more particularly to an edging blade and to a moldboard attachment which may be associated therewith.

The edging blade consists of an edged disc 17 loosely rotatable on the shaft 3 and preferably mounted on appropriate roller bearings 18. When the lawn is being edged, that is, when a grove is being cut, the wheel 7 will be adjusted to the proper height to run along the walk 19 while the wheel 6 travels over the ground. The edging blade 17 cuts close into the walk at right angles to sharply define the edge of the lawn by making a groove and the reel is of general conventional design except that the blades are arranged to provide a conical cage-like structure to bevel the lawn as at 20. Sometimes in preparing the ground, the cutter bar 13 and the packer wheel 14 will be removed and instead a moldboard 21 consisting of a flat blade, the standard 22 and the curved tail-piece 23 will be fastened to the side 2 and to a bar 24, the end 25 of which may be secured to the side 2. It will be observed that the land side 26 of the moldboard is in a straight line to fit close against the edge of the walk so that the cutting edge 27 will bevel off the ground adjacent to the edge of the walk to edge the ground and bevel it preparatory to planting the grass seed. The outstanding curved tail-piece 23 will throw the soil over upon the walk 19 where it can be gathered up by loosely mounting the blade of the cutting disc on shaft 3, it is obvious that the cutting disc can travel at a slower speed than the reel because the latter is positively driven through the pinion 4 and the gear 5. Inasmuch as the reel is cone-shaped, the edge of the lawn or the ground will be beveled in a convenient and expeditious manner.

What I claim and desire to secure by Letters-Patent is:—

An edger comprising a frame, a positively driven horizontal shaft on the frame, a cone-shaped reel fixed to the shaft having transverse knives inclined with respect to the shaft to cut on an incline, and an edging disc loosely mounted on the shaft at one end of the reel.

In testimony whereof I affix my signature.

CARL STULTZ.